H. L. LITCHFIELD & C. E. SHIPLET.
ACTUATOR FOR CLUTCHES AND OTHER DEVICES.
APPLICATION FILED FEB. 26, 1917.
1,294,496.
Patented Feb. 18, 1919.
2 SHEETS—SHEET 1.
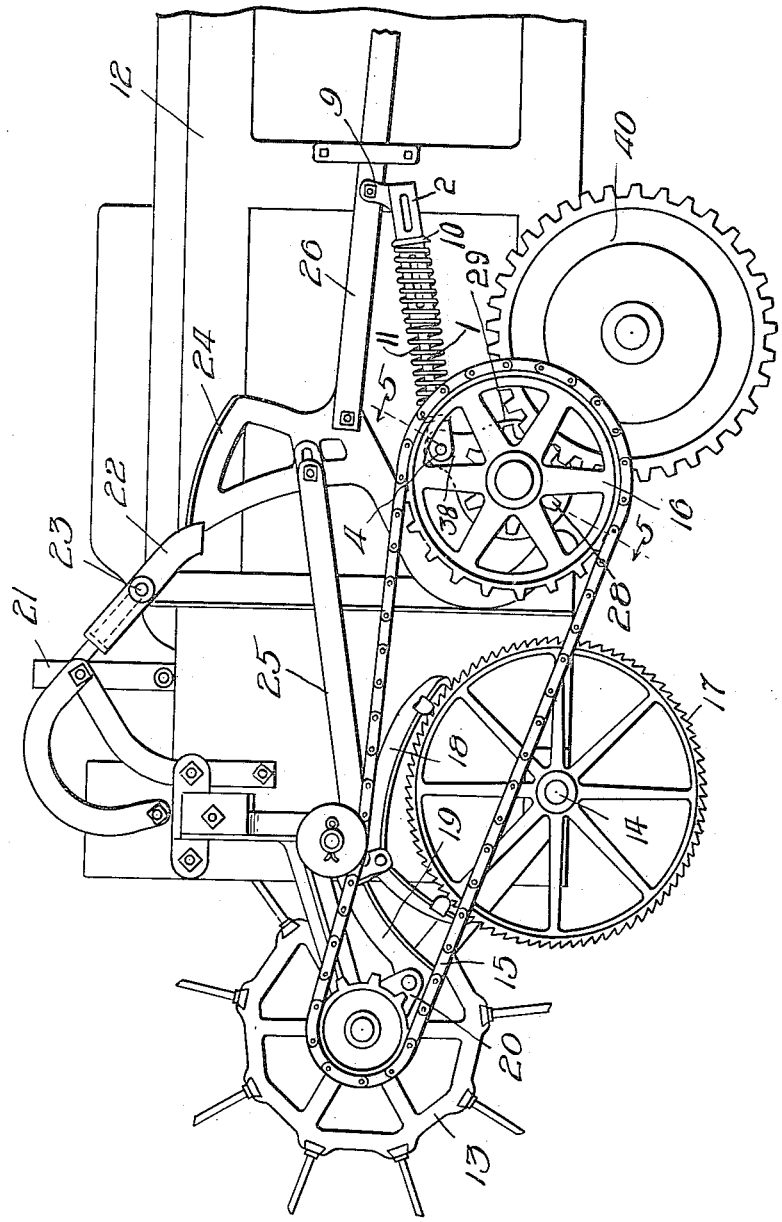

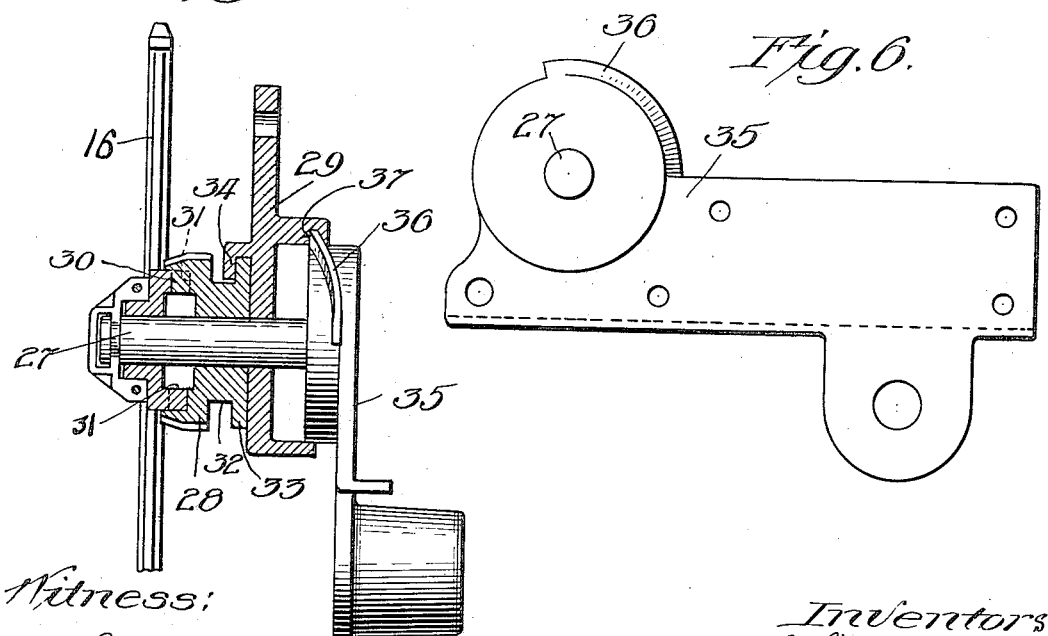

UNITED STATES PATENT OFFICE.

HENRY L. LITCHFIELD AND CLARENCE E. SHIPLET, OF WATERLOO, IOWA, ASSIGNORS TO THE LITCHFIELD MANUFACTURING COMPANY, OF WATERLOO, IOWA, A CORPORATION OF IOWA.

ACTUATOR FOR CLUTCHES AND OTHER DEVICES.

1,294,496. Specification of Letters Patent. Patented Feb. 18, 1919.

Application filed February 26, 1917. Serial No. 150,932.

*To all whom it may concern:*

Be it known that we, HENRY L. LITCHFIELD and CLARENCE E. SHIPLET, citizens of the United States, residing at Waterloo, county of Blackhawk, State of Iowa, have invented a certain new and useful Improvement in Actuators for Clutches and other Devices, and declare the following to be a full, clear, and exact description of the same, such as will enable others skilled in the art to which it pertains to make and use the same, reference being had to the accompanying drawings, which form a part of this specification.

In a well known type of manure spreader there is arranged between the spreading mechanism and the rear axle of the machine a toothed clutch, the parts of which can be brought into interlocking engagement with each other only when they occupy a predetermined position measured angularly of their common axis. The result is that when the driver or operator attempts to throw in the clutch he usually finds that the clutch members do not register, making it necessary to move the spreader until registration of the clutch members is obtained. The result is that the driver must usually wait until his team has started before being able to throw in the clutch, instead of being able to adjust everything before starting the team. The throwing in of the clutch while the spreader is in motion often results in injury to the clutch members because the driver, trying to be extremely careful, does not act quickly enough and therefore causes the clutch teeth to grind on each other and break; the more careful and conscientious the driver or operator is, the greater the chance of injuring the clutches. There is another disadvantage and that is that where the clutch can be thrown in only when the rear wheels of the spreader occupy a predetermined angular position, it is difficult to demonstrate the spreader fully while it is standing still on the sample floor. In order to make the control of the spreading mechanism as simple as possible, it is desirable that all of the parts be governed by a single lever. Thus it is advantageous to have a single lever control not only the clutch but also the tail gate and the feeding means for the conveyer. Under the state of the art as it has heretofore existed, it has been impossible to shift a common controlling lever completely from one limit of its movement to the other unless the clutch teeth happen to be in registration with each other.

Our invention, therefore, while capable of being used in other situations and for other purposes than connection with manure spreaders, has for its principal object to produce a simple and novel arrangement which will permit the clutch lever to be thrown fully into clutching position, regardless of the relative angular positions of the clutch members; and it has for a subsidiary object to provide a simple and novel arrangement by means of which a single controlling lever for a plurality of devices or mechanisms may be shifted fully from one position to the other even though one of the devices or mechanisms be in such a position or under such a condition that the controlling lever is temporarily ineffective to move the same.

In carrying out our invention we place between the operating lever and the shiftable member of the clutch a yieldable connecting rod which, in case the clutch members are out of registration with each other, permits the lever to be moved and store up energy which will thereafter be utilized to throw in the clutch when the members thereof come into registration. Viewed in one of its aspects, therefore, our invention may be regarded as having for its object to produce a yieldable connecting rod which shall be simple in construction, easy to assemble, and not liable to get out of order.

The various features of novelty whereby our invention is characterized will hereinafter be pointed out with particularity in the claims; but, for a full understanding of our invention and of its objects and advantages, reference may be had to the following detailed description taken in connection with the accompanying drawings, wherein:

Figure 1 is a side elevation of the rear end of a manure spreader equipped in accordance with the present invention, such parts as are unnecessary for the understanding of the invention being omitted;

Fig. 2 is a view of the connecting rod, on an enlarged scale, in longitudinal section, the members to which it is mutually connected being shown in elevation;

Fig. 3 is a section taken approximately on line 3—3 of Fig. 2, on a somewhat larger scale than Fig. 2;

Fig. 4 is a transverse section through one member of the connecting rod, on the same scale as Fig. 3;

Fig. 5 is a section taken approximately on line 5—5 of Fig. 1; and

Fig. 6 is a side elevation of the stationary casting or bracket illustrated in Fig. 5.

Reference being first had to Figs. 2 to 4 of the drawings, 1 and 2 represent two members of an extensible connecting rod. The member 1 may conveniently be a rod or bar of any suitable cross section having near one end an enlarged flange, 3, beyond which is a suitable fork, 4, by means of which it may be attached to an actuating or actuated part. At the opposite end of the member 1 is a head, 5, while a similar head, 6, is placed at some distance from the head 5. The member 2 is in the form of a tube the interior diameter of which is slightly greater than that of the heads 5 and 6 so that the latter may enter the interior of the member 2 and, while capable of moving longitudinally of the same, serve as a bearing to maintain the members 1 and 2 in axial alinement with each other. At the front or inlet end of the member 2 are a plurality of inwardly projecting lugs, 7. Each of the heads 5 and 6 has in the periphery thereof a plurality of notches or recesses, 8, each large enough to receive one of the projections 7; the spacing of the notches being the same as the spacing of the projections. At the opposite end of the member 2 are upwardly projecting ears, 9, by means of which this member may be attached to an actuating or an actuated member.

It will be seen that the members 1 and 2 may be assembled upon each other by bringing the projections 7 and the notches 8 into registration with each other and then slipping the heads 5 and 6 into the member 2. Then, upon turning the members 1 and 2 relatively to each other through an angle sufficient to bring the projections and notches out of registration with each other, the two parts of the connecting rod are interlocked so that they cannot be separated in the axial direction. In order to hold the parts of the connecting rod in such relative angular positions that the projections and the notches are out of registration with each other, we arrange the jaws 4 and 9 in such planes that the members 1 and 2 must be turned relatively to each other after having been assembled, before the jaws can be properly attached to the members between which the connecting rod extends.

On the exterior of the member 2, between the ends thereof, is a flange or collar, 10. Surrounding the member 2 and extending between the flange or collar 10 and the flange 3 on the member 1, is a long coiled spring, 11, under an initial tension so that the connecting rod is normally held extended with the head 6 abutting against the projections 7. It will be seen that the connecting rod may be shortened by pressing the member 1 into the member 2 against the tension of the spring.

In Figs. 1, 5 and 6 there is illustrated a well known form of manure spreader to which the connecting rod heretofore described is applied. Referring to these figures, 12 represents the bed or body of a spreader at the rear end of which is a beater wheel, 13. The driving shaft, 14, for the conveyer, (not shown) by which the material is fed rearwardly toward the beater wheel is supported below and in front of the latter. The beater wheel is driven by a sprocket chain, 15, passing over a driving sprocket, 16, which is adapted to be driven from a member rotatable with one of the rear wheels of the spreader. The shaft 14 has thereon a ratchet wheel, 17, adapted to be turned step by step by a pawl device, 18, which is adjustable along an actuating arm, 19, adapted to be oscillated by a suitable driving device, 20, connected with the beater wheel. The rate at which the conveyer travels for a predetermined speed of the beater wheel, is controlled by shifting the pawl device, 18, lengthwise of the arm 19. At the rear of the spreader bed, and in advance of the beater wheel, is a tail gate, 21, having an actuating and supporting arm, 22, pivoted to the bed of the spreader at 23. An actuating lever, 24, engages with the arm 22 and it is also connected with the pawl device, 18, by a connecting rod, 25. The lever 24 is actuated by a rod or bar, 26, extending into the vicinity of the driver's seat. All these parts are of old and well known construction and need not therefore be described in detail.

The sprocket wheel, 16, is mounted on a stationary stub shaft, 27, so as to be rotatable thereon without having capacity for axial movements. On the shaft 27, between the sprocket wheel and the spreader body, are a pinion, 28, and an actuating device, 29. The pinion 28 is movable lengthwise of the shaft as well as being freely rotatable thereon. The pinion and the sprocket wheel are provided with clutch teeth, 30 and 31, respectively, on the sides facing each other. The pinion is provided on the side or end farthest from the sprocket wheel with a neck, 32, having at its end a flange, 33. The actuating member 29 has a part, 34, hooked over the flange 33 so as to connect the pinion and the actuating member for movements together in the direction of the length of the stub shaft, while permitting freedom of relative rotary movements. On the casting or bracket 35 from which the stub shaft 27 extends is a cam rib, 36, concentric with the axis of the shaft but receding gradually from a plane at right angles to the shaft. The rib 36 extends into a groove, 37, in the member 29. Consequently, when the member 29 is turned on the supporting shaft, it is caused to travel lengthwise of the shaft by reason of its interlocking engagement with the cam rib. The parts are so proportioned that the endwise movement of the actuating member, during a comparatively small angular movement, is sufficient to throw the clutch in or out, depending upon the direction in which the actuating member is moved.

The member 29 is connected to the controlling bar 26 by means of the extensible connecting rod heretofore described; the member 29 having an arm, 38, which fits into the jaw 4 of the connecting rod and is attached thereto by a pivot pin, 38$^a$, and the jaw 9 at the opposite end of the connecting rod being slipped up from beneath so as to embrace the controlling bar 26 and being attached to this bar by means of a suitable pintle, 39.

The pinion 28 is adapted to be actuated by a gear wheel, 40, rotatable with one of the rear wheels of the spreader.

It will be seen that the common controlling member, 26, for the clutch, the tail gate and the feeding devices, may be moved freely at all times regardless of the angular relation of the clutch teeth. When the operator desires to throw in the clutch, lift the tail gate, and adjust the feeding device, he simply shifts the controlling lever. If the clutch members are in registration, the clutch will be thrown in simultaneously with the lifting of the gate and the adjustment of the feeding device; but, if the clutch members are not in registration with each other, so that the clutch actuating member 29 cannot be swung rearwardly, the two halves of the yielding connecting rod will slide upon each other, increasing the tension of the spring. A pressure is thus applied to the movable member of the clutch which causes the clutch to be thrown in instantly when the clutch teeth register with each other. In other words, the parts are placed in such condition that when, after starting the team, the pinion 28 is turned far enough to permit it to move laterally into clutching engagement with the sprocket wheel, the tension of the spring is exerted instantly and there is no danger that the teeth will pass partially by each other and produce a grinding action such as occurs with a rigid connecting rod. It will therefore be seen that not only is the operator enabled to throw in the clutch or insure that it will be thrown in automatically upon starting the team, but in addition there is secured the advantage of a clean quick clutching engagement which saves the mechanism from the injurious effects which ordinarily result from attempting to throw in the clutch while the spreader is moving.

While we have illustrated and described with particularity only a single preferred form of our invention, we do not desire to be limited to the exact structural details thus illustrated and described; but intend to cover all forms and arrangements which come within the terms employed in the definitions of our invention constituting the appended claims.

We claim:

1. In combination, a plurality of devices to be moved including a toothed clutch, a common controller for said devices, and a yieldable power-storing device between said controller and the movable member of the clutch for permitting the controller to be operated to move all of said devices except the movable member of the clutch when the teeth of the clutch are out of registration and simultaneously store up power for actuating the clutch when registration of the clutch teeth thereafter occurs.

2. In combination, a toothed clutch, a device to be moved, a controller for said device, and a yieldable power-storing means between said controller and one member of the clutch for permitting the controller to be operated to move said device and also the said clutch member when the teeth of the clutch are in registration with each other and to move said device and store up power for subsequently actuating the clutch in case the teeth of the clutch happen to be out of registration.

3. In combination, a plurality of devices freely movable at all times, a toothed clutch, a common controller for said devices, and said clutch, connections between said controller and said devices, and a yieldable power-storing means between the said controller and one member of the clutch for permitting the controller to be operated to move said devices regardless of the position of the teeth of the clutch and simultaneously store power for subsequently actuating the clutch if the teeth of the clutch are out of registration when the controller is operated.

4. In combination, a lever, an elongated journal passing through said lever, an actuating rod, a spring connection between the actuating rod and the lever for turning the latter about said journal, and means for moving said lever lengthwise of the journal when the lever is rotated.

5. In combination, a lever, an elongated journal passing through said lever, an actuating rod, a spring connection between the actuating rod and the lever for turning the latter about said journal, and means for positively moving said lever lengthwise of the journal when the lever is rotated.

6. In combination, a bracket having a journal projecting therefrom, a lever mounted on said journal so as to be capable of swinging around the same and be moved lengthwise thereof, interlocking cam shoulders between the bracket and the lever for causing the latter to move lengthwise of the journal while it is being moved angularly thereof, an operating member, and a spring between the operating member and the lever.

In testimony whereof, we sign this specification.

HENRY L. LITCHFIELD.
CLARENCE E. SHIPLET.